A. R. REESE.
Improvement in Hose-Pipes.
No. 115,895. Patented June 13, 1871.
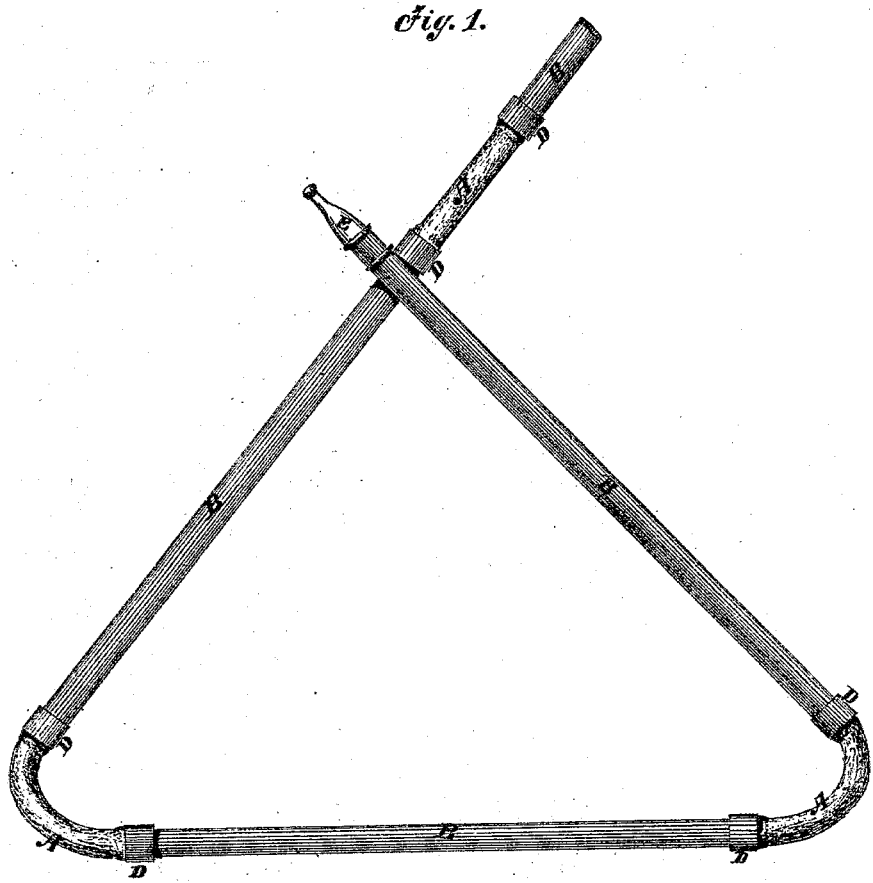
Fig. 1.
Fig. 2.
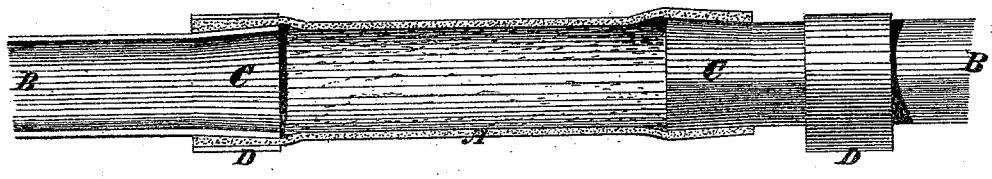
Witnesses.
Inventor:
Adam R. Reese

UNITED STATES PATENT OFFICE.

ADAM R. REESE, OF PHILLIPSBURG, NEW JERSEY.

IMPROVEMENT IN HOSE-PIPES.

Specification forming part of Letters Patent No. 115,895, dated June 13, 1871.

*To all whom it may concern:*

Be it known that I, ADAM R. REESE, of Phillipsburg, county of Warren and State of New Jersey, have invented certain new and useful Improvements in Hose, of which the following is a full, clear, and exact description, reference being had to the accompanying drawing making part of this specification, in which—

Figure 1 is a perspective view, and Fig. 2 is a plan view, representing part of the hose cut half in two lengthwise.

My invention consists of an improved construction of hydrant or conducting water-hose, with metallic sections put together with flexible connections. I have been using for hydrant-hose brass pipe, with about three-fourths-inch hole in diameter, cut three or three and one-half feet in length, with rubber or other flexible connections about seven or eight inches in length. Thus it will be readily seen that hose manufactured on the principle alluded to will last a lifetime, except the rubber or other flexible connection between the metal sections, which will last at least as long as hose made entirely of the same flexible material; and when the flexible material between the metal sections gives out it can easily be replaced by a boy twelve years old. In connecting the hose to the hydrant, that can be done by the same coupling that is now in general use; or by inserting a short piece of the metal pipe, say four inches long, into the pipe at the hydrant, leaving the large end of the pipe projecting about three inches; then slide the rubber or flexible connections over it, and the connection is made the same as putting the rest of the hose together. In putting the hose together I force the metal pipe in the rubber or flexible connection about two inches; I then put the ring on the flexible connection so as to come about even with the end; I then pull them apart; the ring stays to its place, while the metal pipe is drawn back so as to become perfectly air or water-tight between the rubber or flexible material and ring.

Similar letters of reference denote corresponding parts in both figures.

Fig. 2 represents a part of the hose cut half in two, lengthwise. The letters A A in Figs. 1 and 2, are the flexible connections, which can be made of either rubber or any other flexible material, and cut to about seven or eight inches in length. The letters B B in Figs. 1 and 2 are the metal pipes or sections that can be made of brass or sheet-iron pipe. I prefer making the sections of brass pipe, but sheet-iron, galvanized, makes them the cheapest. C, in Fig. 2, represents, in one section, the end of the metal pipe cut half in two, lengthwise. The other section C, in Fig. 2, shows it left round. The end of the pipe or sections is about three-sixteenths of an inch larger than any of the rest of the pipe or sections, running back to a taper about one inch in length. A, in Fig. 2, is the flexible connection. This is cut half in two, lengthwise, thus showing an edge view of the metal pipe inserted in the flexible or rubber connection. It will be seen that it is impossible to pull them apart, as the harder they are pulled the tighter they get, on account of the taper in the metal pipe. D D, in Fig. 1, show the rings all to their places when the hose are put together. D, in Fig. 3, shows one of the rings hanging loose on the metal section B in same figure. E in Fig. 1 is the nozzle fastened on the end of the metal pipe, thus saving the cost of an expensive nozzle.

Having thus described my invention, what I claim, and desire to secure by Letters Patent, is—

As a new article of manufacture, the hose within described, consisting of the pipes B having the flared ends C, flexible connections A, and rings D, when all are combined substantially as specified.

ADAM R. REESE.

Witnesses:
A. J. SNYDER,
J. H. MIERS.